Patented July 10, 1928.

1,676,899

UNITED STATES PATENT OFFICE.

HATTIE L. HEFT, MAY B. VAN ARSDALE, AND DOROTHY E. SHANK, OF NEW YORK, N. Y., ASSIGNORS TO TEACHERS COLLEGE, A CORPORATION OF NEW YORK.

EDIBLE PRODUCT AND METHOD OF PRODUCING SAME.

No Drawing.   Application filed August 20, 1925.   Serial No. 51,504.

Our invention relates broadly to food products and more especially to palatable foods made from mixtures comprising as an ingredient fatty acids having an odd number of carbon atoms in their molecules.

It has been found that fatty acids having an odd number of carbon atoms in their molecules have valuable remedial, or prophylactic, properties because they do not produce acidosis in cases of diabetes.

The more important of these odd-carbon fatty acids possess extremely disagreeable and offensive tasting properties, thus causing their proper physiological administration to be difficult, and at times practically impossible.

The sensitiveness of many persons to compounds possessing disagreeable tasting qualities makes it impossible for them to swallow such compounds, especially where the proper administration of the compounds requires frequently repeated dosages.

For these reasons the usefulness of these non-acidosis producing compounds is very limited, and their administration is limited to those patients who are not susceptive to these unpleasant and obnoxious tasting qualities.

We have found that the above objectionable features of the odd-carbon fatty acids can be overcome, and that they can be administered in a form in which they are practically tasteless.

Our invention, in addition to removing the objectionable tasting qualities of the class of fatty acids referred to above, also possesses the valuable feature of producing products which in themselves are highly nutritious, thus performing the double function of allowing of the general administration of these non-acidosis producing compounds and of supplying nutriment therewith.

We have found that the objectionable tasting qualities of fatty acids having an odd number of carbon atoms in the molecule can be eliminated by mixing them with farinaceous materials, the mixture preferably containing other baking ingredients for purposes of palatability, and baking the resulting mixture preferably to a condition of crispness.

Although the preferred products of our invention may be made in any physical form which will allow of crispness, we prefer to make them in the form of comparatively thin wafers, as this form lends itself to more ready and certain crispness production.

By non-acidosis producing odd-carbon fatty acids, we mean those fatty acids having an odd number of carbon atoms in their molecules and which do not cause, or produce, acidosis in cases of diabetes, among which may be mentioned undecylic acid ($C_{11}H_{22}O_2$), tridecylic acid ($C_{13}H_{26}O_2$), pentadecylic acid ($C_{15}H_{30}O_2$), heptadecylic acid or margaric acid ($C_{17}H_{34}O_2$), nondicyclic acid ($C_{19}H_{38}O_2$), but we do not limit ourselves to these particular fatty acids.

By farinaceous materials we mean the farinaceous flours suitable for the production of baked products, but we prefer to employ gluten flour because of its suitability and value for diabetic diet.

By baking ingredients we mean those materials which are suitable as ingredients in baked products, as baking powder, eggs, milk, salt, sugar and saccharine.

By eliminating the offensive tasting qualities of these fatty acids, we mean eliminating, removing, destroying or reducing these offensive tasting qualities to a condition in which they are scarcely perceptible or entirely imperceptible, thus removing the offensive feature of the tasting qualities.

As an example of the ingredients capable of producing a product by our process, we give the following:—

138 grams gluten flour.
3 grams baking powder.
20 grams non-acidosis odd-carbon fatty acids.
37 grams egg whites.
6.8 grams powdered skim milk.
1 gram salt.
62 c. c. water.

As some of the non-acidosis producing odd-carbon fatty acids are tallow-like in consistency, it is advisable that they be broken up into a fine powder, as by forcing them through a fine sieve. The thoroughly mixed ingredients are formed into wafer shapes, and preferably baked for from 25 to 30 minutes at a temperature of substantially 360° F., which thus produces crisp wafers, in which the non-acidosis producing odd-carbon fatty acids are practically undiscernible by means of taste.

Pleasant tasting materials such as cocoa, cheese and similar products may be incorporated in the mixture, the following being an example of such a mixture:—

138 grams gluten flour.
3 grams baking powder.
6.8 grams milk powder.
20 grams non-acidosis odd-carbon fatty acids.
50 grams egg whites.
28 grams Parmesan cheese.
1 gram salt.
60 c. c. water.

The method of production of the crisp wafer from this mixture is as described above.

It is evident from the foregoing that our invention produces palatable nutritious products in which the disagreeable tasting qualities of the non-acidosis producing odd-carbon fatty acids having been eliminated, thus presenting an inviting and unobjectionable method of administering these compounds.

We do not limit ourselves to the particular chemicals, times, temperatures or steps of procedure mentioned herein as these are given simply as a means for clearly describing our invention.

Having described our invention, what we claim is:—

1. The method of producing edible food products from mixtures comprising non-acidosis producing odd-carbon fatty acids, which method comprises mixing the said odd-carbon fatty acids with a farinaceous material and baking the mixture.

2. The method of producing edible food products from mixtures comprising non-acidosis producing odd-carbon fatty acids, which method comprises mixing the said odd-carbon fatty acids with a farinaceous material and other baking materials, and baking the mixture.

3. The method of producing edible food products from mixtures comprising non-acidosis producing odd-carbon fatty acids, which method comprises mixing the said odd-carbon fatty acids with an albuminoid material and baking the mixture.

4. The method of producing edible food products from mixtures comprising non-acidosis producing odd-carbon fatty acids, which method comprises mixing the said odd-carbon fatty acids with a farinaceous material and baking the mixture at a temperature substantially 360 degrees Fahrenheit.

5. The method of producing edible food products from mixtures comprising non-acidosis producing odd-carbon fatty acids, which method comprises mixing the said odd-carbon fatty acids with an albuminoid material and baking the mixture at a temperature substantially 360 degrees Fahrenheit.

6. The method of producing palatable food products which comprises mixing non-acidosis producing odd-carbon fatty acids with gluten flour and heat treating the same to a condition of crispness.

7. The method of producing palatable food products which comprises mixing non-acidosis producing odd-carbon fatty acids with gluten flour and other baking ingredients, and heat treating the same to a condition of crispness.

8. An edible article of manufacture comprising a heat treated farinaceous product containing non-acidosis producing odd-carbon fatty acids.

9. An edible article of food comprising a heat treated non-acidosis producing odd-carbon fatty acids, and a compound of albuminoids.

10. An edible article of food comprising non-acidosis producing odd-carbon fatty acids, and a compound of albuminoids baked to crispness.

11. A cooked palatable food produced from a mixture comprising non-acidosis producing odd-carbon fatty acids and a farinaceous compound in which the proportions of the farinaceous compound to the said acid is substantially seven to one.

12. A cooked palatable food produced from a mixture comprising non-acidosis producing odd-carbon fatty acids and an albuminoid compound in which the proportions of the albuminoid compound to the said acid is substantially seven to one.

13. A cooked palatable food produced from a mixture comprising non-acidosis producing odd-carbon fatty acids and a farinaceous compound in which the proportions of the farinaceous compound to the said acid is substantially seven to one.

14. A cooked palatable food produced from a mixture comprising non-acidosis producing odd-carbon fatty acids and an albuminoid compound in which the proportions of the albuminoid compound to the said acid is substantially seven to one.

HATTIE L. HEFT.
MAY B. VAN ARSDALE.
DOROTHY E. SHANK.